(12) United States Patent
Chisuwa

(10) Patent No.: US 7,967,316 B2
(45) Date of Patent: Jun. 28, 2011

(54) STRADDLE-TYPE VEHICLE

(75) Inventor: Yoshinori Chisuwa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 342 days.

(21) Appl. No.: 12/024,047

(22) Filed: Jan. 31, 2008

(65) Prior Publication Data

US 2008/0179151 A1    Jul. 31, 2008

(30) Foreign Application Priority Data

Jan. 31, 2007 (JP) ................. 2007-022314

(51) Int. Cl.
*B62J 7/00* (2006.01)
(52) U.S. Cl. .................. 280/288.4; 280/304.4
(58) Field of Classification Search .......... 188/379; 267/140, 152, 153; 280/288.4, 304.3, 835; 180/68.3
See application file for complete search history.

(56) References Cited

U.S. PATENT DOCUMENTS

| 4,068,859 | A | * | 1/1978 | Dittman | 280/304.4 |
| RE34,072 | E | * | 9/1992 | Asakura et al. | 180/68.3 |
| 6,622,811 | B2 | * | 9/2003 | Nakagawa | 180/219 |
| 7,258,357 | B1 | * | 8/2007 | Berezny | 280/288.4 |
| 7,353,903 | B2 | * | 4/2008 | Miyabe et al. | 180/219 |
| 7,497,295 | B2 | * | 3/2009 | Sato et al. | 180/219 |
| 2002/0185322 | A1 | * | 12/2002 | Dichter | 180/219 |

FOREIGN PATENT DOCUMENTS

| JP | 2005-247022 | 9/2005 |
| JP | 2006-088892 | 4/2006 |

* cited by examiner

*Primary Examiner* — Christopher P Schwartz
(74) *Attorney, Agent, or Firm* — Keating & Bennett, LLP

(57) ABSTRACT

A body frame of a straddle-type vehicle includes a frame extending along an outer side surface of a fuel tank. A first vibration isolating member is sandwiched between the frame and the fuel tank. Vibration transmitted to the fuel tank through the body frame is damped by the first vibration isolating member. A second vibration isolation member may be sandwiched between a seat of the vehicle and an upper surface of the fuel tank to further damp vibrations. The vibration members may be integrated with a cover of the fuel tank.

12 Claims, 7 Drawing Sheets

STRADDLE-TYPE VEHICLE

RELATED APPLICATIONS

This application claims the benefit of priority under 35 USC 119 of Japanese patent application no. 2007-022314, filed on Jan. 31, 2007, which application is hereby incorporated by reference in its entirety.

BACKGROUND OF THE INVENTION

1. Field of the Invention

The present invention relates to a straddle-type vehicle, and more particularly, to a vibration isolating structure of a fuel tank of a straddle-type vehicle.

2. Description of Related Art

Straddle-type vehicles may include a fuel tank attached to a body frame below a seat. Such a vehicle is disclosed, for example, in JP-A-2006-88892. If fuel is supplied to the engine by fuel injection, a fuel pump is attached to the fuel tank to control the supply of fuel to the engine. JP-A-2005-247022 discloses a straddle-type vehicle in which a fuel pump is attached to the fuel tank.

Fuel tanks are typically not too thick in order to maintain a lightweight structure. In addition, the top surface of the fuel tank typically has a fuel filler hole and, if fuel is supplied by fuel injection, a fuel pump mounting hole for mounting the fuel pump. Therefore, the top of the fuel tank is not very rigid. Vibration of the engine is transmitted to the fuel tank through the body frame and causes the fuel pump to vibrate in the fuel tank since the top of the fuel tank is not very rigid. Excessive vibration of the fuel pump may cause problems in refueling.

The inventor has investigated methods for damping this vibration. For example, the inventor tried pressing down the vibrating portion of the top of the fuel tank from above with a load from the seat, with an elastic member such as rubber attached to a part adjacent to the seat. However, the vibration was not damped sufficiently only by pressing down the vibrating portion. Therefore, further improvement is required.

SUMMARY OF THE INVENTION

A straddle-type vehicle according to the invention has a fuel tank attached to a body frame. The body frame includes a frame extending along an outer side surface of the fuel tank. A first vibration isolating section is sandwiched between the frame and the fuel tank.

In one embodiment, the fuel tank has a flange that protrudes laterally, and the first vibration isolating section is vertically sandwiched between the flange tank and the frame extending along the outer side surface of the fuel tank.

In one embodiment, the first vibration isolating section has depressions according to a shape of the frame, at a part in contact with the frame. The first vibration isolating section may also have grooves on the surface in contact with the frame.

In one embodiment, the first vibration isolating section is integrated with a cover that covers a periphery of a fuel filler of the fuel tank.

In one embodiment, where the fuel tank has a flange that protrudes laterally, the first vibration isolating section has a groove that is fitted on the flange.

In one embodiment, the fuel tank is disposed under a seat and a second vibration isolating section is sandwiched between a back of the seat and an upper surface of the fuel tank. In the case where a cover covers the periphery of the fuel filler of the fuel tank, the second vibration isolating section may be integrated with the cover.

With this straddle-type vehicle, vibration of the fuel tank is damped by the first vibration isolating member sandwiched between the fuel tank and the frame extending along the outer side surface of the fuel tank. Thus, vibration of the upper surface of the fuel tank is reduced to an appropriate level.

With the structure in which the fuel tank is disposed under the seat of the straddle-type vehicle, and the second vibration isolating member is sandwiched between the back of the seat and the upper surface of the fuel tank, vibration of the upper surface of the fuel tank is damped more effectively.

In the case where the first and second vibration isolating members are integrated with a cover that covers the periphery of the fuel filler of the fuel tank, the first and second vibration isolating members are more easily positioned and mounted. Furthermore, the number of components is reduced, allowing cost reduction.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
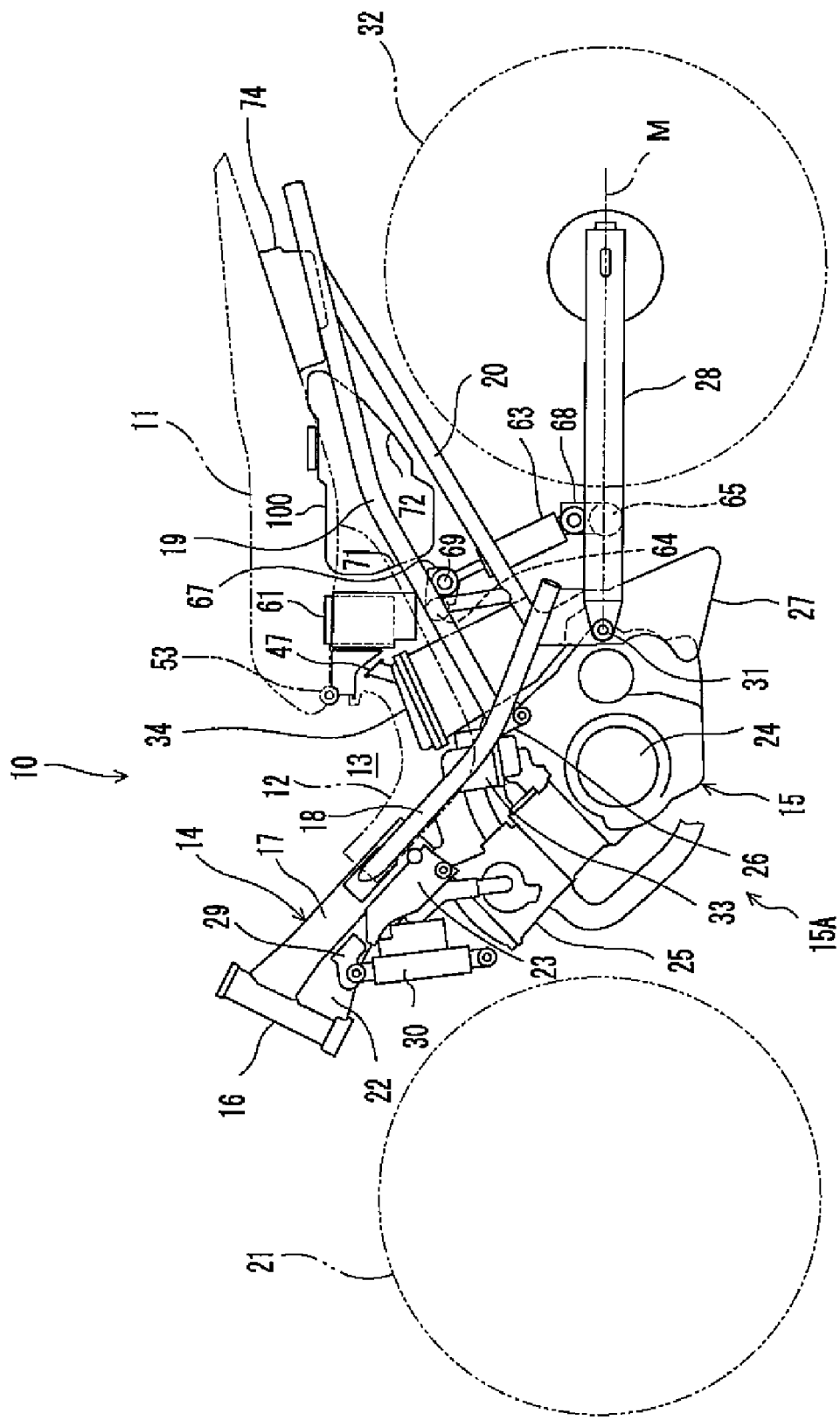
FIG. 1 is a diagram of a frame structure of a straddle-type vehicle according to an embodiment of the invention.

A straddle-type vehicle according to an embodiment of the invention is now described with reference to the drawings. It is to be understood that the invention is not limited to the following embodiment, wherein components and parts that provide the same operation are denoted by the same reference numerals.

Figure 2:
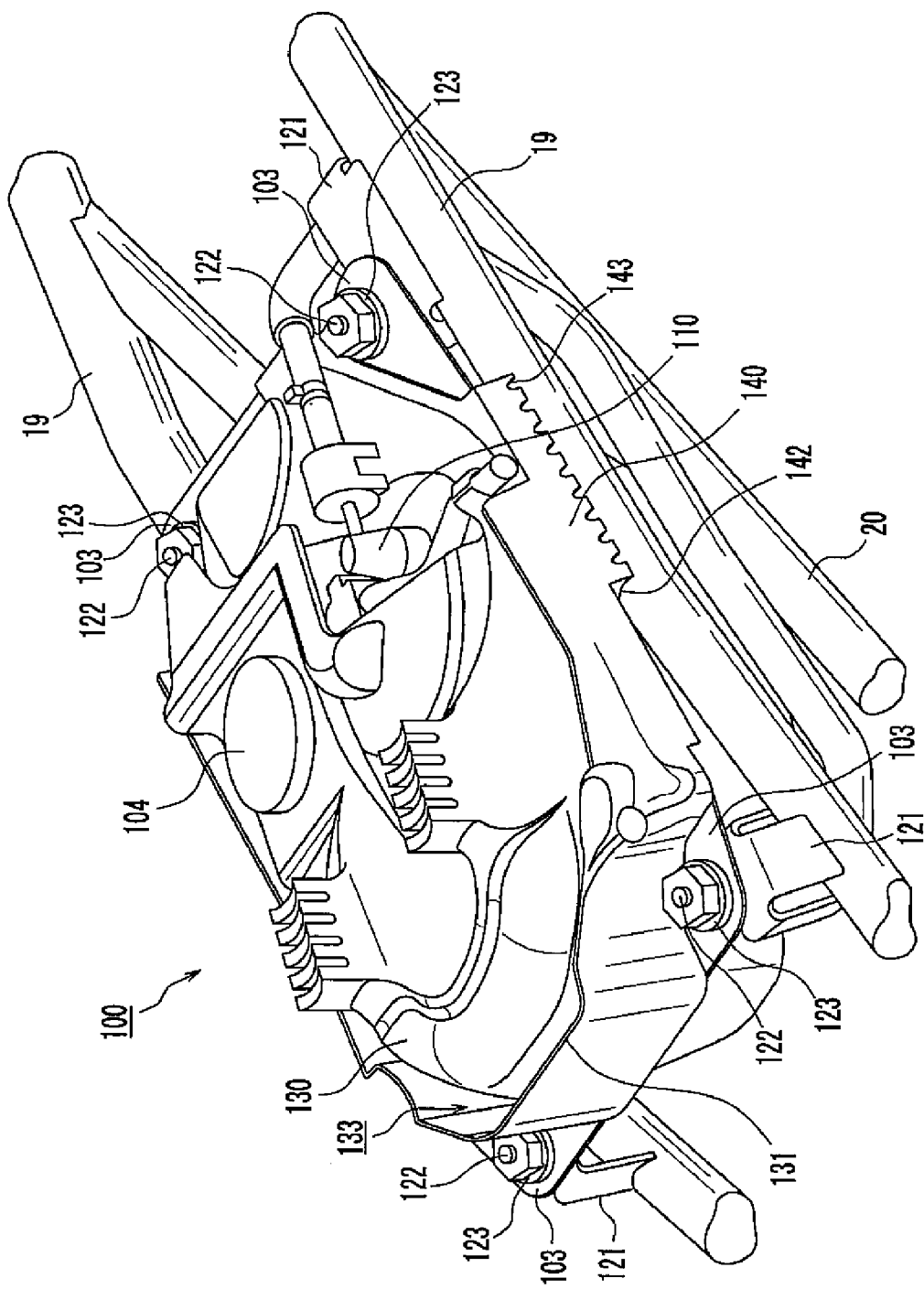
FIG. 2 is a perspective view of a fuel tank of the straddle-type vehicle according to the embodiment of the invention.
Figure 4:
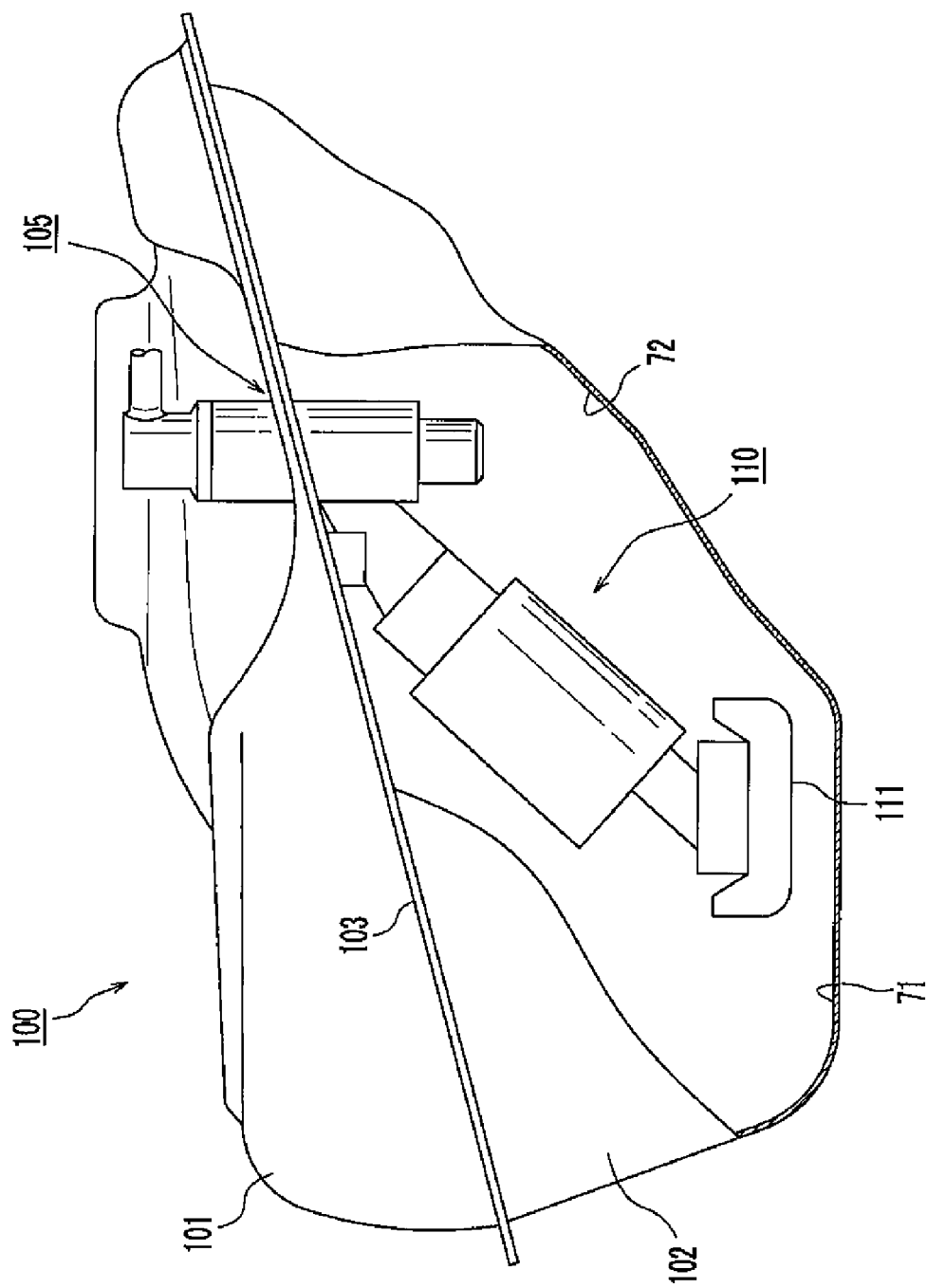
FIG. 4 is a side view of the arrangement of the fuel tank and a fuel pump according to the embodiment of the invention.

As shown in FIG. 1, straddle-type vehicle 10 has a fuel tank 100 attached to a body frame 14. A fuel pump 110 hangs from a top of fuel tank 100 (FIG. 4). Body frame 14 has a frame 19 extending along an outer side surface of fuel tank 100. As shown in FIG. 2, a first vibration isolating member 140 is sandwiched between frame 19 and fuel tank 100. Vibration of fuel tank 100 is thereby damped by first vibration isolating member 140, reducing vibration of the top of fuel tank 100.

Figure 3:
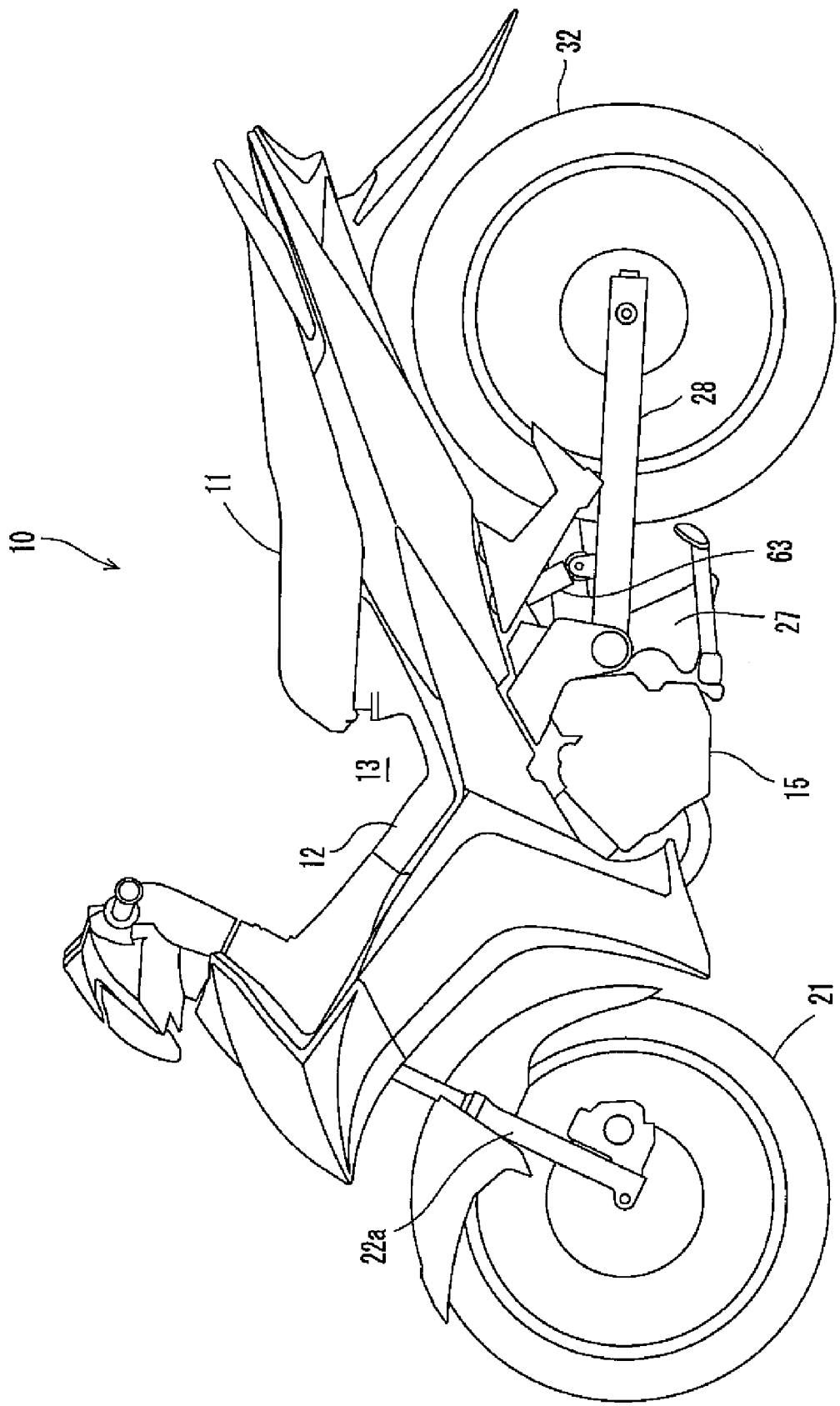
FIG. 3 is a side view of the frame structure of the straddle-type vehicle according to the embodiment of the invention.

Straddle-type vehicle 10 is now described in more detail. As shown in FIG. 3, straddle-type vehicle 10 is a motorcycle with a so-called underbone type frame structure. A detachable seat front cover 12 is mounted to the obliquely lower front of a seat 11. Seat front cover 12 is curved or bent substantially in a recessed shape as viewed from the side. Seat front cover 12 forms a downward hollow space 13 in front of seat 11.

An engine 15 is supported by body frame 14 in a suspended manner. Body frame 14 and engine 15 constitute a body 15A.

Engine 15 includes a cylinder 25 extending f to the obliquely upper front from a crank case 24.

Body frame 14 has a head pipe 16, a main frame 17, a pair of right and left subframes 18, a pair of right and left seat rails 19 and a pair of right and left back stays 20. A steering shaft passes through head pipe 16, under which a front fork 22a (FIG. 3) is provided. Front fork 22a rotatably supports a front wheel 21 at a lower end.

Main frame 17 is connected to and extends to the obliquely lower rear from the rear of head pipe 16. Main frame 17 has a hollow rectangular cross section, however, its shape is not particularly limited. A gusset 22 is fixed to a front lower part of main frame 17. Gusset 22 is provided between the lower part of main frame 17 and the rear of head pipe 16.

Subframes 18 are fixed to right and left sides of main frame 17. Subframes 18 are smaller in diameter and cross section than main frame 17. Subframes 18 are primarily shaped as a circular pipe, while front ends of subframes 18 change from the circular shape to a flat shape. The flat front parts of subframes 18 are face-bonded to both sides of main frame 17 by welding or the like.

Subframes 18 are bent such that central portions curve downward to become a convex shape. The front portions of subframes 18 forward of the bent portions extend substantially in parallel to the axis of cylinder 25 of engine 15. Rear portions of subframes 18 incline more gently than the front portions. Thus, subframes 18 are disposed along engine 15.

Seat rails 19 are joined to the vicinity of the bent portions of subframes 18 by welding or the like and extend to the obliquely upper rear from the vicinity of the bent portions. Seat rails 19 are formed of circular pipes and are bent such that central portions curve upward to become a convex shape.

Back stays 20 are joined to rear ends of subframes 18 by welding or the like and extend to the upper rear in an oblique direction from the rear ends of subframes 18. Rear ends of back stays 20 are joined to rear ends of seat rails 19 by welding or the like. Like seat rails 19, back stays 20 are also formed of circular pipes.

Main frame 17 and subframes 18 constitute a front frame. Seat rails 19 constitute a rear frame. The shape of subframes 18, seat rails 19 and back stays 20 may not necessarily be the circular pipe but may be another shape. The material of body frame 14 may be iron, aluminum or another material.

A bracket 23 is fixed to a lower rear end of main frame 17 and is fitted with cylinder 25 of engine 15 with a bolt and a nut. Brackets 26 are fixed to the vicinity of the bent portions of subframes 18 and are fixed to crank case 24 of engine 15 with bolts and nuts. Brackets 27 are fixed to the rear ends of subframes 18 and support crank case 24 of engine 15 and rear arms 28. Thus, engine 15 is supported by main frame 17 and subframes 18 in a suspended manner.

The front ends of rear arms 28 are each supported by bracket 27 in such a manner as to pivot about a pivot shaft 31. A rear wheel is rotationally supported at rear ends of rear arms 28. In this embodiment, rear arm 28 is supported by body frame 14 with bracket 27. However, rear arm 28 may instead be supported by part of engine 15.

A radiator 30 is disposed in obliquely upper front of engine cylinder 25 and below main frame 17. Radiator 30 is supported by a bracket 29 fixed to gusset 22 which is fixed to the lower part of main frame 17.

A fuel injector 33 is provided above crank case 24 of engine 15 and at the rear of cylinder 25. An air cleaner 34 is provided behind fuel injector 33 and is disposed between the right and left frames of body frame 14. That is, air cleaner 34 is disposed between right subframe 18 and seat rail 19 and left subframe 18 and seat rail 19. Air cleaner 34 is supported by a cross pipe provided to brackets 27 of back stays 20 and brackets attached to right and left seat rails 19. Air intake port 47 of air cleaner 34 extends to the upper rear in an oblique direction. Air sucked through air intake port 47 passes through a filter element in air cleaner 34 and is supplied to fuel injector 33 through an air feed pipe.

As shown in FIG. 1, a hinge mechanism 53 disposed under a front end of seat 11 allows seat 11 to be opened and closed by rotating about the front end.

A rear cushion unit 63 is disposed at the rear of air cleaner 34. A cross member 64 is placed between right and left seat rails 19 and is fixed to an upper cushion bracket 67. Upper cushion bracket 67 protrudes downward of seat rails 19 and supports the upper end of rear cushion unit 63.

A cross member 65 is placed between right and left rear arms 28 and is fixed to a lower cushion bracket 68. Lower cushion bracket 68 protrudes upward of rear arms 28 and supports the lower end of rear cushion unit 63. Therefore, the lower end of rear cushion unit 63 is supported above a vertical center of rear arms 28 (center line M of the rear arm 28). Thus, rear cushion unit 63 is disposed between upper and lower cushion brackets 67 and 68.

As shown in FIG. 1, a battery 61 is disposed to the obliquely upper rear of air cleaner 34 and to the obliquely upper front of rear cushion unit 63. Fuel tank 100 is disposed at the rear of battery 61. A storage box 74 is disposed at the rear of fuel tank 100. Battery 61, fuel tank 100 and storage box 74 are disposed under seat 11. A rear wheel 32 is attached to rear ends of rear arms 28, which are vertically pivotally supported by pivot shaft 31 and rear cushion unit 63. Rear wheel 32 is disposed to the obliquely lower rear of fuel tank 100.

As shown in FIG. 4, fuel tank 100 is composed of an upper member 101 and a lower member 102 joined together by welding. Upper member 101 of fuel tank 100 is dented upward and has an externally protruding flange 103 around its circumference. Lower member 102 of fuel tank 100 is dented downward and has an externally protruding flange 103 around its circumference. The circumferential flanges around upper and lower members 101 and 102 of fuel tank 100 are abutted and firmly fixed together by seam welding. Thus, fuel tank 100 has an externally protruding flange 103 on the side.

As shown in FIGS. 1 and 2, fuel tank 100 is disposed between right and left seat rails 19. The bottom of fuel tank 100 is lower than seat rails 19. As shown in FIG. 4, the bottom of fuel tank 100 is lower and deeper at front part 71 than at rear part 72. Rear part 72 inclines upward toward the rear to decrease in depth and to provide rear wheel 32 with space to vibrate upward. Fuel tank 100 is deeper and larger in capacity at front part 71 than rear part 72, so that a necessary capacity is ensured.

Figure 5:
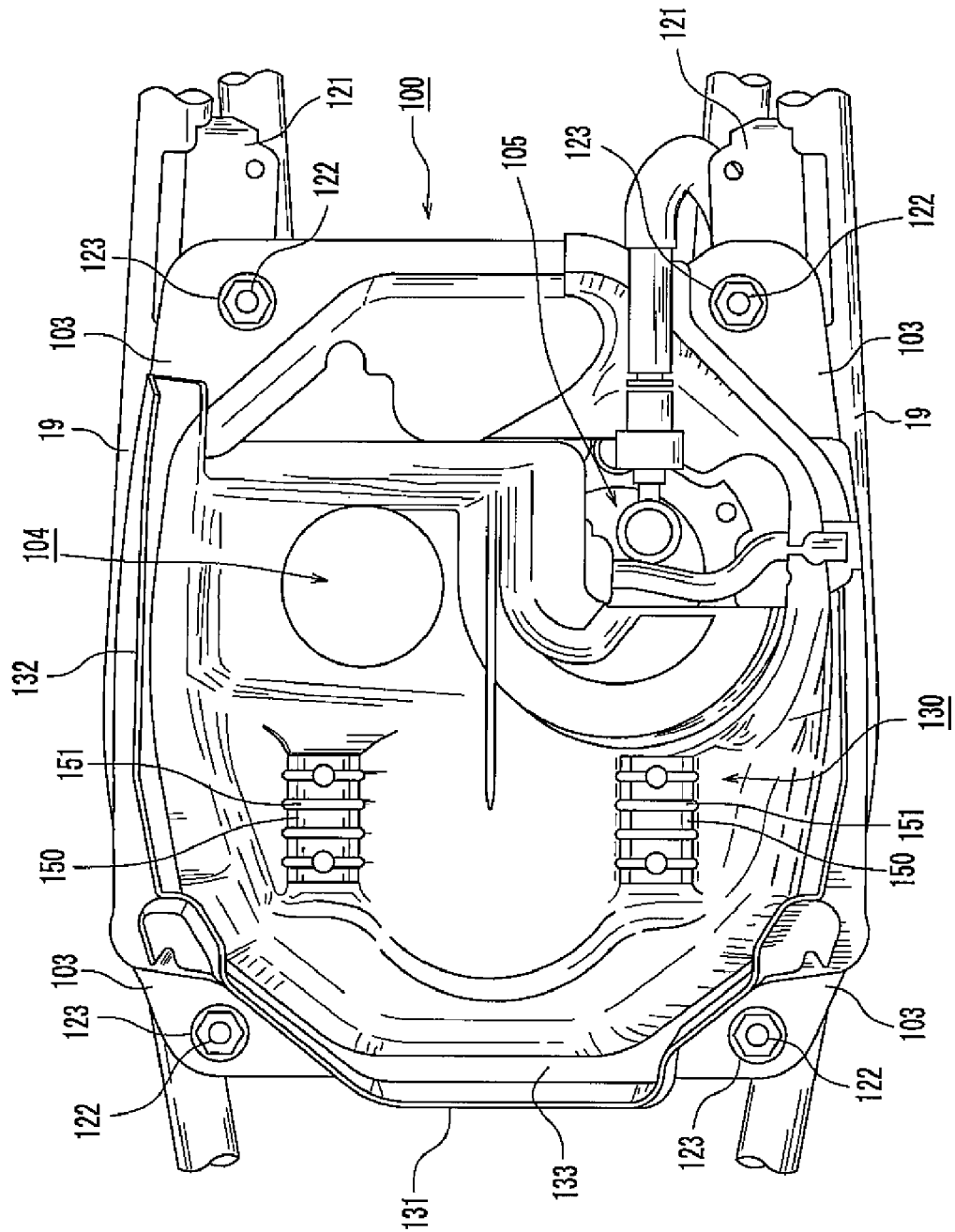
FIG. 5 is a plan view of the fuel tank according to the embodiment of the invention.

Fuel pump 110 for supplying fuel to fuel injector 33 is supported such that it hangs from the top of fuel tank 100. As shown in FIG. 5, the upper surface of fuel tank 100 has a fuel filler 104 and a mounting hole 105 for mounting fuel pump 110. Mounting hole 105 is formed in the rear and left part of the upper surface of fuel tank 100.

As shown in FIG. 4, fuel pump 110 hangs from the top of fuel tank 100. The upper end of fuel pump 110 is mounted to mounting hole 105. As previously described, the bottom of fuel tank 100 is shallow at rear part 72 and deep at front part 71. Fuel pump 110 and motorcycle 10 also have structural limitations. Therefore, as shown in FIG. 4, fuel pump 110 is mounted to the rear part of the upper surface of fuel tank 100 and extends in a forward and downward oblique direction in fuel tank 100. That is, fuel pump 110 extends obliquely from mounting hole 105 to the lower front in fuel tank 100. The lower end of fuel pump 110 extends to the deep portion of front part 71 of fuel pump 110, where a suction port 111 for sucking fuel is provided.

Figure 6:
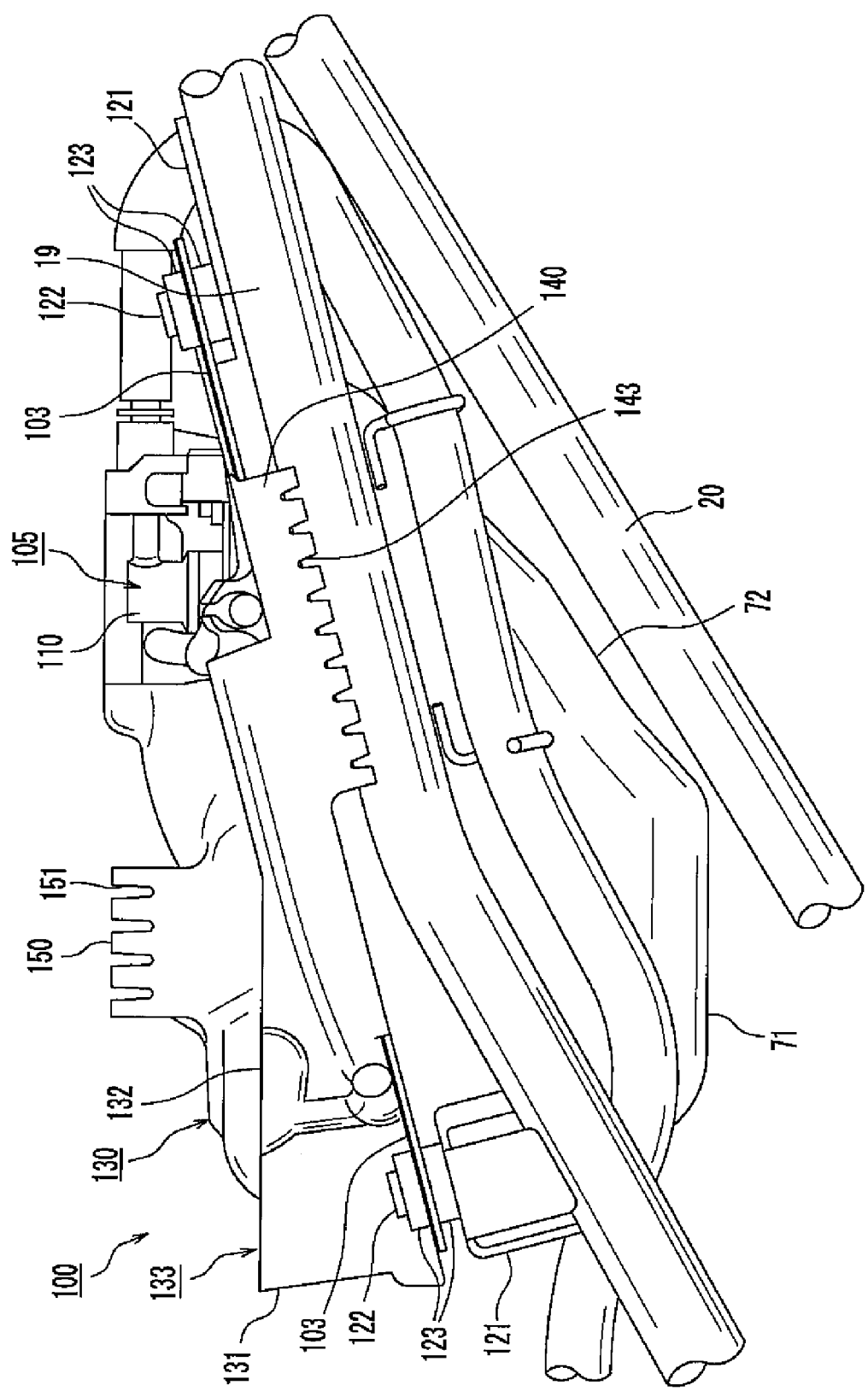
FIG. 6 is a left side view of the fuel tank according to the embodiment of the invention.

As shown in FIGS. 5 and 6, the front and back or right and left corners of fuel tank 100 are attached to stays 121, which are attached to right and left seat rails 19 with bolts and nuts 122. Bolts and nuts 122 are fitted with rubber washers 123.

As shown in FIG. 5, a rubber cover 130 covers the periphery of the fuel filler of fuel tank 100. The upper surface of cover 130 covers the upper surface of fuel tank 100 except for mounting hole 105 and fuel filler 104. Cover 130 has walls 131 and 132 at the front and sides, respectively, of its upper surface. The front of the upper surface of cover 130 has an oil sump 133 (fuel tray) that is shallower than the periphery. Fuel overflowing to the periphery of fuel filler 104 is prevented from spilling and flows toward oil sump 133. The bottom of oil sump 133 has a drain pipe for discharging fuel appropriately. Thus, fuel overflowing from fuel filler 104 during refueling is discharged by cover 130 through the drain pipe of oil sump 133.

As shown in FIG. 2, first vibration isolating member 140 extends along an outer side surface of fuel tank 100 between fuel tank 100 and frames 19. First vibration isolating member 140 is sandwiched vertically between flange 103 of fuel tank 100, which protrudes laterally as described above, and seat rail 19 extending on the side of fuel tank 100.

Figure 7:
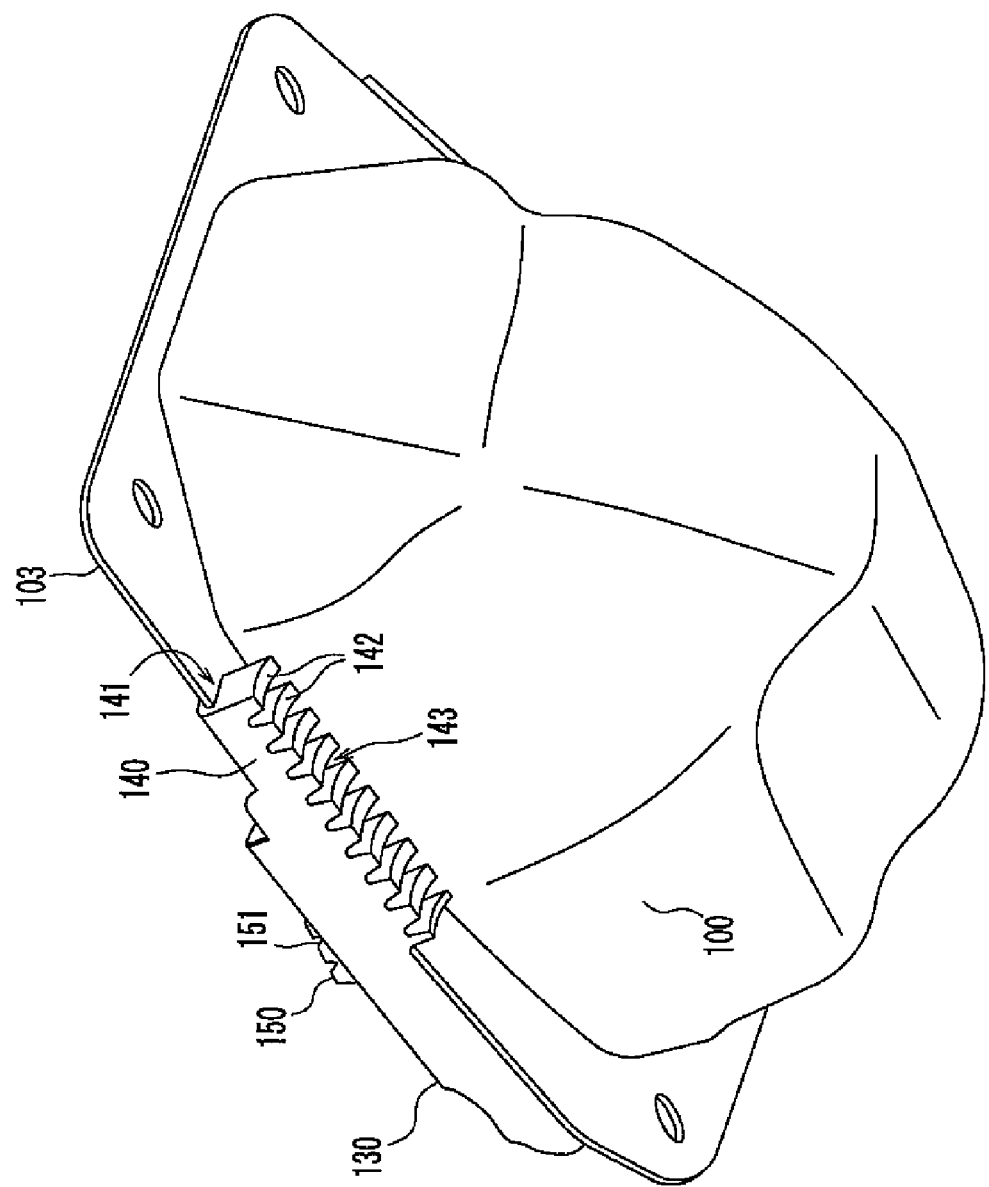
FIG. 7 is a perspective view of a first vibration isolating member according to the embodiment of the invention.

As shown in FIG. 2, first vibration isolating member 140 is integrated with cover 130 that covers the periphery of fuel filler 104 of fuel tank 100. That is, cover 130 extends along the outer surface of fuel tank 100 to flange 103, and at the lower end, it is integrated with first vibration isolating member 140 serving as a first vibration isolating section. Thus, first vibration isolating member 140 is disposed in an appropriate position of fuel tank 100 by attaching cover 130 to fuel tank 100. As shown in FIG. 7, first vibration isolating member 140 has a groove 141 for attaching it to flange 103. Groove 141 is fitted on flange 103 when cover 130 is attached to fuel tank 100.

Since first vibration isolating member 140 is integrated with cover 130, the number of components is decreased as compared with a case in which first vibration isolating member 140 is separate from cover 130, so that the cost is reduced. Furthermore, since first vibration isolating member 140 has groove 141 that is fitted on flange 103 when cover 130 is attached to fuel tank 100, cover 130 is mounted in a position of fuel tank 100 with higher stability and first vibration isolating member 140 is located in a position of fuel tank 100. This facilitates the operation of mounting first vibration isolating member 140 as compared with a case in which first vibration isolating member 140 is separate from cover 130.

As shown in FIG. 7, first vibration isolating member 140 has on its lower surface depressions 142 according to the shape of frame 19. That is, depressions 142 are shaped according to the shape of the upper surface of left seat rail 19 because isolating member 140 is disposed on left seat rail 19. Thus, first vibration isolating member 140 is disposed in tight contact with the upper surface of left seat rail 19 with stability.

Furthermore, first vibration isolating member 140 has grooves 143 on its lower surface in contact with frame 19, as shown in FIG. 6. Crosswise grooves 143 are provided at intervals and provide first vibration isolating member 140 with appropriate elasticity to facilitate tight contact with left seat rail 19 and to damp vibration of fuel tank 100.

First vibration isolating member 140 is sandwiched between fuel tank 100 and frame 19 extending along the outer side surface of fuel tank 100. Therefore, vibration transmitted from engine 15 to fuel tank 100 through body frame 14, is damped, and vibration of the upper surface of fuel tank 100 and fuel pump 110 is reduced. Moreover, first vibration isolating member 140 is sandwiched vertically between flange 103 of fuel tank 100 and left seat rail 19 extending on the left of fuel tank 100. Therefore, vertical vibration of the upper surface of fuel tank 100 is damped effectively. Thus, vibration of the upper surface of fuel tank 100 and fuel pump 110 is reduced more effectively.

Fuel pump 110 is attached to either the right or left upper surface of fuel tank 100, as described above (in this embodiment, on the left). In this case, there is no need to attach first vibration isolating member 140 on both the right and left sides. Accordingly, first vibration isolating member 140 is sandwiched between fuel tank 100 and frame 19 on the side (right or left) to which fuel pump 110 (a heavy article) is attached. Thus, since first vibration isolating member 140 is sandwiched between fuel tank 100 and the side of frame 19 to which fuel pump 110 is attached, vibration of the upper surface of fuel tank 100 and fuel pump 110 is reduced.

As shown in FIG. 1, fuel tank 100 is disposed under seat 11. A second vibration isolating member 150 integrated with cover 130 is sandwiched between the back of seat 11 and the upper surface of fuel tank 100. The back of seat 11 is in contact with the upper surface of second vibration isolating member 150 serving as a second vibration isolating section. The upper surface of second vibration isolating member 150 has crosswise grooves 151 at intervals. Grooves 151 provide second vibration isolating member 150 with appropriate elasticity to facilitate tight contact with left seat 11 and to damp vibration of fuel tank 100 more effectively.

Second vibration isolating member 150 is subjected to a load from seat 11. Thus, the upper surface of fuel tank 100 is pressed by an appropriate load from seat 11. Second vibration isolating member 150 damps vibration of the upper surface of fuel tank 100 in cooperation with first vibration isolating member 140. Moreover, integration of second vibration isolating member 150 with cover 130 facilitates positioning and mounting of second vibration isolating member 150 to seat 11 and fuel tank 100. Furthermore, since second vibration isolating member 150 is integrated with cover 130, the number of components is decreased and cost is reduced.

In this embodiment, the cover is made of rubber, so that first vibration isolating member 140 and second vibration isolating member 150 are formed when the cover is formed.

Thus, in motorcycle 10, fuel pump 110 is supported in fuel tank 100 such that it hangs from the top of fuel tank 100. Accordingly, when the upper surface of fuel tank 100 vibrates, fuel pump 110 is prone to vibrate. Particularly, fuel pump 110 vibrates more easily because fuel pump 110 is hung at an angle in fuel tank 100. However, since first vibration isolating member 140 is sandwiched between seat rail 19 and fuel tank 100, vibration of the upper surface of fuel tank 100 and fuel pump 110 due to vibration of engine 15 or the like is damped appropriately to prevent problems in fuel pump 110. Furthermore, since the upper surface of fuel tank 100 is pressed by second vibration isolating member 150 sandwiched between the back of seat 11 and the upper surface of fuel tank 100, vibration of fuel pump 110 is further reduced by cooperation of first and second vibration isolating members 140 and 150, thus allowing more stable refueling.

While the invention has been described with reference to one embodiment of a straddle-type vehicle, it is to be understood that the invention is not limited to the embodiment described above.

For example, in this embodiment, fuel injector 33 and fuel pump 110 are attached to the top of fuel tank 100. However, the invention may also be applied to a vehicle equipped with a carburetor in place of the fuel injector. In this case, although no fuel pump is disposed in the fuel tank, the fuel tank is still vibrated because of vibration of the engine or the like. Thus, use of first vibration isolating member 140 is still advantageous to prevent vibration of fuel tank 100.

While the embodiment described above has a structure in which the fuel tank has a laterally protruding flange, and the first vibration isolating member is sandwiched vertically between the flange and the frame extending along the outer side surface of the fuel tank, the invention is not limited to this structure. The fuel tank may not have such a flange, and the first vibration isolating member may not be vertically sandwiched between the flange and the frame. For example, the first vibration isolating member may be sandwiched between an outer side surface of the fuel tank and the frame.

In the embodiment described above, the first vibration isolating member (first vibration isolating section) has depressions according to the shape of the frame and grooves on the surface in contact with the frame. However, the first vibration isolating member is not limited to this structure.

For example, the first vibration isolating member may only be sandwiched between the fuel tank and the frame extending along the outer side surface of the fuel tank to damp vibration of the fuel tank. The second vibration isolating member may only be sandwiched between the back of the seat and the upper surface of the fuel tank to damp vibration of the fuel tank. While the embodiment described above shows one example of appropriate shapes of the first and second vibration isolating members, the invention is not limited to these shapes.

For example, the first vibration isolating member may not have depressions according to the shape of the frame, but may still have grooves on the surface in contact with the frame. Alternatively, the first vibration isolating member may have depressions according to the shape of the frame, but not grooves on the surface in contact with the frame. In place of or in combination with the grooves, the first vibration isolating member may have crosswise through holes on the sides in the widthwise direction to regulate its elasticity.

Although, the first vibration isolating member is described as integrated with the cover of the fuel tank, it may not be integrated with the cover. For example, it may be separate from the cover and fixed to the side of the fuel tank or frame with a fastening member such as a bolt, or may be separate and bonded to the side of the fuel tank or frame. The second vibration isolating member may also be separate from the cover and fixed to the upper surface of the fuel tank or the back of the seat with a fastening member such as a bolt, or bonded to the upper surface of the fuel tank or the back of the seat.

While an underbone type motorcycle has been described as an example of the straddle-type vehicle, the invention is not so limited, and can be broadly applied, for example, to other motorcycle frame structures, scooter type vehicles, and four-wheel buggies.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A straddle-type vehicle comprising:
    a body frame including a frame;
    a fuel tank attached to the body frame, the frame arranged to extend along a side surface of the fuel tank; and
    a first vibration isolating section sandwiched between the frame and the fuel tank; wherein
    the fuel tank includes a flange that protrudes laterally;
    a first portion of the flange of the fuel tank is fixedly attached to the frame with a fixing device; and
    the first vibration isolating section is sandwiched directly between a second portion of the flange of the fuel tank and a portion of the frame extending along the side surface of the fuel tank.

2. The straddle-type vehicle according to claim 1, wherein the first vibration isolating section is provided with depressions that correspond to a shape of a portion of the frame where the first vibration isolating section contacts with the frame.

3. The straddle-type vehicle according to claim 2, wherein the depressions are arranged on a grooved surface of the first vibration isolating section arranged to come into contact with the frame.

4. The straddle-type vehicle according to claim 1, further comprising:
    a fuel tank cover arranged to cover a periphery of a fuel filler of the fuel tank; wherein
    the first vibration isolating section is provided integrally with the fuel tank cover.

5. The straddle-type vehicle according to claim 4, wherein the first vibration isolating section includes a groove that is fitted on the flange.

6. The straddle-type vehicle according to claim 1, further comprising:
    a fuel tank cover arranged to cover a periphery of a fuel filler of the fuel tank; and
    a second vibration isolating section sandwiched between a bottom of a seat arranged above the fuel tank and an upper surface of the fuel tank; wherein
    the second vibration isolating section is provided integrally with the fuel tank cover.

7. The straddle-type vehicle according to claim 6, wherein the fuel tank cover, the first vibration isolating section, and the second vibration isolating section are an integrated member.

8. The straddle-type vehicle according to claim 1, further comprising:
    a fuel pump; wherein
    the fuel pump is arranged to hang from an upper surface of the fuel tank.

9. The straddle-type vehicle according to claim 8, wherein an uppermost surface of the first vibration isolating section is arranged above an uppermost surface of the fuel pump.

10. The straddle-type vehicle according to claim 1, wherein the fixing device includes a first rubber washer sandwiched between the first portion of the flange of the fuel tank and the frame.

11. The straddle-type vehicle according to claim 10, wherein the fixing device further includes a bolt and a nut arranged to attach the first portion of the flange of the fuel tank to the frame, and a second rubber washer sandwiched between the bolt and the first portion of the flange of the fuel tank.

12. The straddle-type vehicle according to claim 1, wherein the first vibration isolating section includes grooves on a surface of the first vibration isolating section that come into contact with the frame.

* * * * *